May 7, 1946.  R. F. HAYS, JR  2,399,675
SIGNAL AMPLIFIER
Filed Jan. 22, 1943

INVENTOR
ROBERT FRED HAYS, JR
BY
Herbert H. Thompson
HIS ATTORNEY

Patented May 7, 1946

2,399,675

UNITED STATES PATENT OFFICE 2,399,675

SIGNAL AMPLIFIER

Robert Fred Hays, Jr., Syosset, N. Y., assignor to Sperry Gyroscope Company, Inc., Brooklyn, N. Y., a corporation of New York Application January 22, 1943, Serial No. 473,269

13 Claims. (Cl. 175—320)

My invention particularly relates to an amplifier circuit for controlling a motor in response to a signal input and which will control the motor both in its direction of operation and also in its extent or length of time of operation.

My invention is particularly adapted for use in connection with correcting the position of the spin axis of a gyro, or the rotatable element associated therewith as in a gyro compass, or in connection with an automatic pilot for controlling the steering of a ship. In devices of this character the spin axis of the gyroscopic instrument may deviate from a predetermined position or the position of a second or follow-up element may be shifted relative thereto. Where such gyroscopes are universally mounted, the deviation or change in position of the spin axis or the rotor bearing case may take place about any or all of the mutually perpendicular axes upon which it is rotatably mounted, or, as in an automatic pilot for aircraft, a follow-up element may be shifted about any of these axes and relative to a reference element positioned by the gyro instrument. To correct for such deviation, or to return the follow-up element into correct relationship to the reference element, torque motors are provided to act in one direction or the other about one axis of the universal support for the gyro to produce a correcting movement or precession of the gyro about a second axis, or, correspondingly, servo motors are provided to change the direction or attitude of the ship or aircraft to thereby restore the predetermined relationship of reference and follow-up elements. The operation of these torque and servo motors is controlled by a signal derived from a signal transformer or pick-off device which is designed to detect displacement of the gyro or one of its associated, rotatable supporting elements relative to a linear reference which may be, for example, the vertical or a direction in azimuth, or to detect deviation between a linear reference provided by the gyro and a follow-up element. In either event, the signal so derived is employed to control the operation of the motor in one direction or the other to return an element to correct relationship with an adopted reference and to maintain this relationship.

In at least one form of gyro compass or automatic pilot, a balanced relay is employed, the armature of which is normally held in a neutral position but, in response to a signal, is moved in one direction or the other to close a circuit to a motor controlled thereby. The present amplifier circuit is particularly adapted for use in controlling the operation of a relay of this character in response to a signal derived from a signal transformer or pick-off device.

It is the primary object of this invention to provide an amplifier circuit which is readily adjustable to provide different operating characteristics.

Another object resides in providing an amplifier circuit which comprises a pair of electron discharge tubes having their plate circuits connected across a source of alternating current and with the plate circuit of at least one tube arranged and connected to feed bias potentials to the grid of the other tube.

Still another object resides in providing an amplifier circuit of the above-described character which includes means for varying the bias potentials fed from the plate circuit of one tube to the grid of the other.

A still further object resides in providing an amplifier circuit of the foregoing character in which the feed-back circuits include rate circuits whereby the output of the amplifier circuit is a function not only of the displacement but also a function of the rate of change of such displacement and may be a function of an acceleration component of such displacement.

With these and other objects in view, my invention includes the novel arrangement and correlation of elements described below and illustrated in the accompanying drawing, in which—

Figure 4:
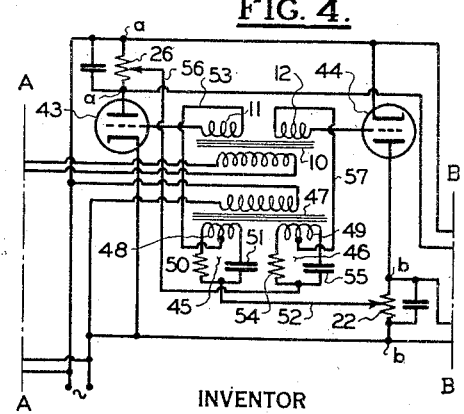

Fig. 4 discloses a modified circuit employing gas-filled tubes.

In the drawing, I have illustrated a pick-off or signal transformer for supplying a signal to the grids of the electron discharge tubes of the amplifier circuit. The signal transformer, somewhat diagrammatically illustrated, which is of the usual type employed in providing a signal of one phase sense or the other, for example, is displaced in one direction or the other relative to a reference or when the axis of the rotor bearing case of a gyro or one of its supporting elements, such as the vertical ring, deviates in one direction or the other from a predetermined position. One form of pick-off or signal transformer is disclosed in the copending application, Serial No. 448,794, of Halpert, Frische, Bird and Esval. The signal transformer, indicated generally at 1, comprises an E-shaped core 2 and an armature 3. One of these elements is fixed with respect to a reference member while the other is fixed with respect to a second member to be maintained substantially in a predetermined position with respect to the reference member. Therefore, any deviation between these members will produce a corresponding change in relative position of the core 2 and armature 3 and thereby produce a signal which is employed to control a deviation-correcting motor.

The central leg of the core 2 has an exciting winding 4 which is connected across a suitable source of alternating current, such as that indicated at 5, and the outer legs of the core are provided with secondary windings 6 and 7 which are connected together in voltage opposition and in the grid circuit of an amplifier tube 8. Tuning condensers may be connected across these secondaries as illustrated.

When a change occurs in the relationship of the armature 3 and core 2 with, for example the armature moving closer to the leg of the core bearing the secondary 6 and farther away from the core leg bearing the secondary 7, more flux will pass through the first-mentioned leg than through the latter leg, and, therefore, the voltage generated in coil 6 will predominate over that generated in coil 7, and a signal will be supplied in one phase sense to the grid of tube 8. When the oposite occurs, the voltage of coil 7 will predominate and a signal of the opposite phase sense will be supplied. When equal fluxes flow through both outer core legs, the voltages cancel and no signal is supplied.

In the drawing, the filament or cathode-exciting circuits of the tubes have not been completely shown, but only so much thereof as to complete the circuits of the other elements of the tubes.

The anode or plate circuit of amplifier tube 8 includes a source of plate voltage, illustrated as a battery, and the primary 9 of a transformer 10, the secondaries 11 and 12 of which are connected with the grids of electron discharge tubes 13 and 14, respectively.

Figure 1:
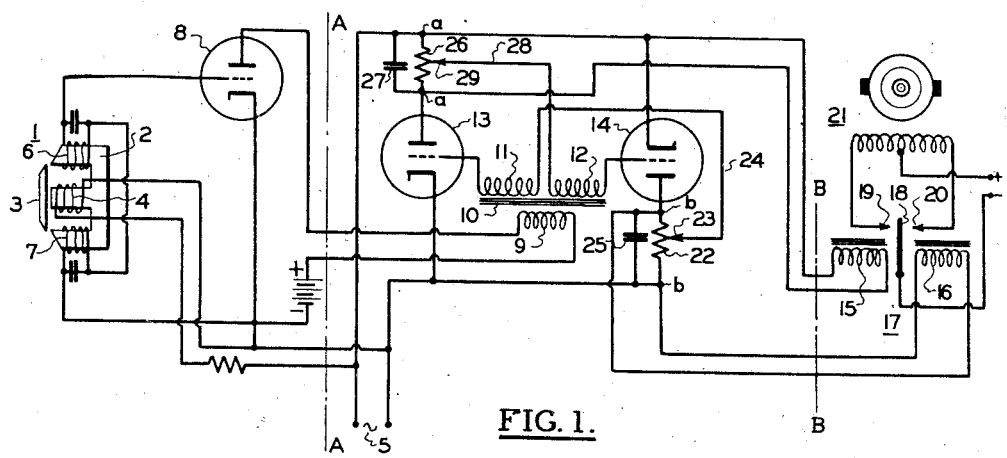
Fig. 1 is a wiring diagram of a preferred circuit arrangement.
Figure 2:
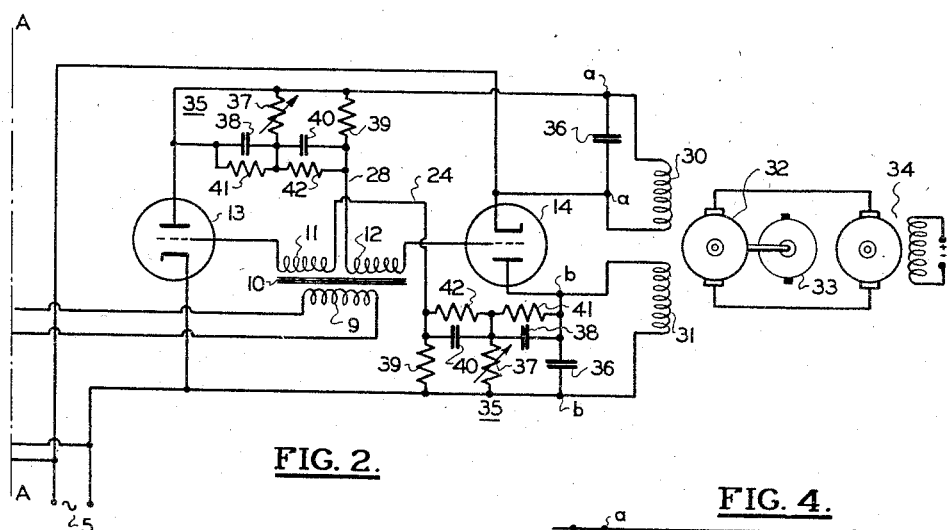
Fig. 2 is a wiring diagram of a modification thereof.

In the circuits of Figs. 1 and 2, electron discharge tubes of the vacuum tube type are employed. However, gas-filled tubes may be used and, in this event, a circuit of the character represented in Fig. 4 is preferably provided. Tubes 13 and 14 are controlled by the signals derived from transformer 10 which are impressed on their grids and control the current which may flow through the coils 15 and 16 of a relay 17. The plate circuits of the tubes 13 and 14 are connected across the alternating current source 5 and in such manner that their plate voltages are in out-of-phase relation. In other words, the plate of tube 13 is connected to one side of the source 5 while the plate of tube 14 is connected to the other side thereof. Furthermore, coil 15 of relay 17 is connected between plate-circuit output taps $a$—$a$ connected respectively to the plate of tube 13 and to one side of the alternating current source 5, while the coil 16 of relay 17 is connected between plate-circuit output taps $b$—$b$ connected respectively to the plate of tube 14 and the other side of the current source 5. Hence, when tube 13 conducts, current will flow through relay coil 15; and when tube 14 conducts, current will flow through relay coil 16. These relay coils are arranged to actuate the armature 18 of the relay 17 in one direction or the other and into engagement either with contact 19 or contact 20 thereby to control the direction of operation of the motor 21, which may be a torque or servo motor.

In the embodiment of my invention shown in Fig. 1, a grid bias may be fed back from the plate circuits of each of tubes 13 and 14 to the grid of the other tube. A resistor or potentiometer 22 is connected across output taps $b$—$b$, in series with the plate of tube 14 and between the plate and one side of the alternating current supply 5. A variable contact 23 of the potentiometer 22 is connected through conductor 24 to one side of the secondary 11 of transformer 10, the other side of which is connected to the grid of tube 13. Condenser 25 is connected across the potentiometer 22 to feed back a D. C. bias potential to the grid of tube 13. Substantially the same construction is employed to feed back a bias potential from the plate circuit of tube 13 to the grid of tube 14, the potentiometer 26 and condenser 27 being connected across output taps $a$—$a$ in the plate circuit of tube 13, as above described in connection with potentiometer 22 and condenser 25. Conductor 28, which is connected to the variable contact 29 of potentiometer 26, serves to connect the potentiometer with one end of the secondary 12 of transformer 10, the other end thereof being connected to the grid of tube 14.

In operation, when a signal is supplied from the signal transformer 1, it will be applied to the grids of electron discharge tubes 13 and 14 in a phase sense either rendering the grid of one tube more negative and that of the other tube more positive or vice versa, depending on the direction of relative movement of core 2 and armature 3 of the signal transformer and, correspondingly, the direction of relative displacement between a follow-up element and a reference member. Therefore, depending on the phase sense of the signal, tube 13 or tube 14 will supply plate current to the coil of relay 17 connected in the plate circuit thereof. Further, both tubes may conduct and provide plate currents to the associated relay coils which currents, of course, will be in opposite directions through said coils and the predominating current will determine the direction of operation of the relay armature. Hence, the circuit operates as a phase-sensitive amplifier to control the operation of a motor in a direction dependent upon the direction of relative movement of the core and armature of the signal transformer.

It will be observed that the contacts 23 and 29 of the potentiometers may be moved along the resistance to vary the potentials in a negative or positive sense which are fed back to bias the grids of the tubes. Hence, the gain of each tube may be varied from a minimum up to the point where control of the operation of the tube is lost. The circuit, therefore, may be adjusted to function in several different manners.

For example, the circuit may be so adjusted that, with no signal, tube 13 will conduct and a maximum current will flow through the plate circuit thereof while the tube 14 may be cut-off. A small signal from the transformer 10 in phase opposition to the plate voltage on tube 13 will cause the plate current therethrough to decrease to a very small value, or it may entirely cut-off, and will cause the current in the plate circuit of tube 14 to rise to its maximum value. Under this method of operation, the circuit may be adjusted so that the tube 14 will continue to supply maximum plate current as long as the above described signal is present and to return to a cut-off condition when the signal goes to zero.

For the circuit to operate in the foregoing manner, potentiometer 26 is so adjusted that when there is no negative bias supplied to the grid of tube 13, the bias on the grid of tube 14, supplied from potentiometer 26, exceeds the cut-off bias for tube 14, and the potentiometer 22 is so adjusted as to feed back, when there is no negative bias on the grid of tube 14, a bias to the grid of tube 13 which is substantially less than the cut-off bias for tube 13.

On the other hand, by suitable adjustment, the circuit may operate as above described but tube 14 will continue to supply full plate current even after the signal has gone to zero and until a signal of opposite phase is supplied to the grids of the tubes.

For a circuit to operate in this manner, the potentiometer 26 is adjusted to supply a bias to the grid of tube 14, when there is no negative bias supplied to the grid of tube 13, which bias exceeds the cut-off bias for tube 14, as hereinbefore described, but the potentiometer 22 is adjusted to feed back, when there is no negative bias on the grid of tube 14, a bias to the grid of tube 13 which is substantially greater than the cut-off bias for tube 13.

By suitable adjustment, either tube 13 or tube 14 may conduct with no signal and, when a signal of proper phase relationship is supplied from transformer 10, one tube will function to supply full plate current while the plate current in the other will diminish to a very low value or cut-out. It will be understood, of course, that if too much biasing potential is fed back, control by the signal may be lost.

Figure 3:
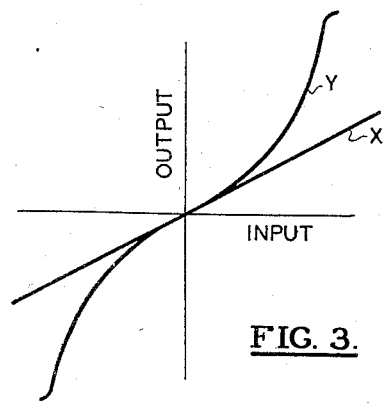
Fig. 3 illustrates operating characteristic curves of the tube elements.

As indicated in Fig. 3, the circuit may be adjusted to function as a linear amplifier, operating along the linear characteristic curve X, and for amplifying either direct current or alternating current with phase sensitivity. By operating on the curved portion of the tube characteristic curve Y, the gain may be made to vary as a large power of the signal voltage. In other words, a small signal or input will be amplified to a comparatively small extent while a slightly larger signal will be amplified to a comparatively great extent.

It will be observed that by operating the circuit in the last-described manner that it becomes admirably suited for use in controlling a relay such as relay 17 of the type hereinbefore described. The armature of the relay is arranged normally to lie in a neutral position without contacting either of the contacts 19 and 20 when zero or substantially zero signal is supplied. However, when sufficient signal is present to effect an operation of the armature, it is desirable that the signal will then bias the armature in one direction or the other and hold it securely against its associated contact. As the curve Y in Fig. 3 will indicate, a very small signal will not be amplified sufficiently to actuate the armature, but a slightly larger signal will provide signal amplification of a relatively high order and thereby serve to move and hold the armature either in one position or the other and prevent chattering.

In Fig. 2 I have illustrated a modified control circuit which, it is to be understood, is adapted to be connected, as indicated by the dot-dash line A—A, with a signal transformer and amplifier tube of the character shown at 1 and 8 in Fig. 1. The output taps a—a and b—b in the plate circuits of the tubes 13 and 14 in this embodiment are respectively connected to field windings 30 and 31 of a generator 32. In other words, the plate of tube 13 is connected through coil 30 to one side of the alternating current supply while the plate of tube 14 is connected through coil 31 to the other side of the source of alternating current. The generator 32, in the embodiment shown, is driven at constant speed by a motor 33 or by any suitable means, and the output of the generator is fed to the armature of a motor 34 having a fixed D. C. field. The motor 34 may be any torque-producing device or a servo motor such as that shown in the aforesaid application Serial No. 448,794.

When no signal current, or equal and opposite currents, flows through the field coils 30 and 31, the generator 32 has no output. Since signal currents flow in opposite directions through coils 30 and 31, when either coil 30 or 31 is energized that coil having signal energy therein, or if they are both energized, the coil having the signal current of greatest magnitude therein, will determine the polarity of the output from generator 32 and the direction of rotation of motor 34.

In the circuit of Fig. 2, I have included rate circuits indicated generally at 35 in the feed-back circuits from the plate circuit of each tube to the grid of the other. These rate circuits, comprising the resistances and capacitances connected in the manner shown, serve to control the output of the amplifier circuit in such manner that the servo motor or torque motor controlled thereby functions not only in the proper direction to correct for deviation but also at a rate which is dependent upon the rate of change of such deviation and also upon acceleration.

In the embodiment illustrated, the rate circuits for feeding back bias potentials from the plate circuit of each tube to the grid of the other are substantially alike and a description of one thereof is believed to be sufficient. The condenser 36, similar to condensers 25 and 27 of Fig. 1, serves to provide a D. C. bias potential to the grid of tube 13. Connected across condenser 36 is a circuit comprising resistance 37 and condenser 38. Condenser 38 will pass current if the voltage across condenser 36 varies. Hence, such a current through condenser 38 will correspond to a rate of change or a time derivative of the voltage across condenser 36 or to a rate of change of the signal voltage. Preferably, as illustrated, resistor 37 is variable so that the magnitude of the rate voltage produced thereacross may be adjusted.

If a potential corresponding to a time derivative or rate of change of the rate voltage, or a potential corresponding to acceleration is desired, the output from resistor 37 is fed to a second resistance and capacity circuit including resistance 39 and condenser 40, as illustrated. The voltage output from resistor 39 will comprise displacement, velocity and acceleration components. In order that the bias potentials fed from the plate circuits to the grids of the tubes may include voltages representing the original bias potential and rate and acceleration potentials, resistances 41 and 42 are connected in shunt across condensers 38 and 40.

In Fig. 4, I have illustrated a circuit similar to that shown in Fig. 1 but in which gas-filled, electron discharge tubes are employed. Rate circuits, such as disclosed in Fig. 2, may, of course, be incorporated in this circuit. The circuit of Fig. 4 is adapted to be connected between a signal transformer and amplifier tube and a load such as the relay 17, as indicated by the dot-dash lines A—A and B—B, and may be adjusted by means of the potentiometers 22 and 26 to operate in the manners hereinbefore set forth. The gas-filled tubes 43 and 44, however, are provided with direct and alternating current bias potentials on the grids thereof and, therefore, an alternating bias is supplied through phase-shifting circuits 45 and 46. A transformer 47 having its primary connected to the source of alternating current supply 5 comprises two secondary windings 48 and 49. The ends of secondary 48 are connected through resistance 50 and capacitance 51 to conductor 52 which is connected with the movable contact on potentiometer 22 while the middle tap of secondary 48 is connected through conductor 53 and secondary 11 of signal input transformer 10 to the grid of tube 43. Likewise, the ends of secondary 49 of transformer 47 are connected through resistance 54 and capacitance 55 to conductor 56 which is connected with the movable contact on potentiometer 26, and the middle tap of secondary 49 is connected through conductor 57 and secondary 12 of transformer 10 to the grid of tube 44.

The circuits 45 and 46 supply alternating current bias potentials to the grids of the tubes in correct phase relation to the alternating plate voltages thereof and control of the direct current bias is obtained through the potentiometers, as hereinbefore explained.

It is to be understood that although I have illustrated and described my amplifier circuit as comprising two separate electron discharge tubes, it will be understood that a single or duplex tube embodying the grid and plate circuit elements of the two tubes may be employed and connected substantially in the same manner as hereinbefore described. Furthermore, it will be understood that by the term "motor," as herein employed, I intend to include substantially any type of motor such as the well-known servo motor, torque motor, relay, or any differentially controlled device.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a signal amplifier circuit, a source of alternating current, a pair of current control, electron discharge tubes including grid and plate circuit elements, output taps adapted to be connected to a controllable load, the plate circuits of said tubes being connected across said alternating current source and including said output taps, means including a rate circuit for supplying a grid bias potential and a derivative thereof from the plate circuit of one tube to the grid of the other, electrical signal supplying means, and means for applying said signal to the grids of said tubes.

2. In a signal amplifier circuit, a source of alternating current, a pair of current control, electron discharge tubes including grid and plate circuit elements, output taps adapted to be connected to a controllable load, the plate circuits of said tubes being connected across said alternating current source and including said output taps, rate circuits connected respectively between the plate circuits of each tube and the grid of the other, electrical signal supplying means, and means for applying said signal to the grids of said tubes.

3. In a signal amplifier circuit, a source of alternating current, current control means comprising a pair of electron discharge tubes including grid and plate circuit elements, output taps adapted to be connected to a motor, the plate circuits of said tubes being connected across said alternating current source and including said output taps, means for feeding back a grid bias potential from the plate circuit of one tube to the grid of the other, means for combining with said bias potential a derivative potential corresponding to the rate of change of said bias potential, electrical signal supplying means, and means for applying said signal to the grids of said tubes.

4. In a signal amplifier circuit, a source of alternating current, current control means comprising a pair of electron discharge tubes including grid and plate circuit elements, output taps adapted to be connected to a motor, the plate circuits of said tubes being connected across said alternating current source and including said output taps, electrical signal supplying means, means for applying said signal to the grids of said tubes, means for feeding back a grid bias potential from the plate circuit of one tube to the grid of the other, and means for producing a derivative potential corresponding to a time rate of change of said signal and for combining said potential with the bias potential.

5. In a signal amplifier circuit, a source of alternating current, current control means comprising a pair of electron discharge tubes including grid and plate circuit elements, output taps adapted to be connected to a motor, the plate circuits of said tubes being connected across said alternating current source and including said output taps, electrical signal supplying means, means for applying said signal to the grids of said tubes, means for feeding back a grid bias potential from the plate circuit of one tube to the grid of the other, and means for producing derivative potentials corresponding to rate of change and acceleration of said signal and for combining said potentials with said bias potential.

6. In a signal amplifier circuit, a source of alternating current, current control means comprising a pair of electron discharge tubes including grid and plate circuit elements, output taps adapted to be connected to a motor, the plate circuits of said tubes being connected across said alternating current source and including said output taps, electrical signal supplying means, means for applying said signal to the grids of said tubes, means for feeding back a grid bias potential from the plate circuit of one tube to the grid of the other, means for producing a first derivative potential corresponding to a rate of change of said signal, and means for producing a second derivative potential corresponding to a rate of change of said first derivative potential, said derivative potentials being combined with the bias potential fed back to the grid of said tube.

7. In a signal amplifier circuit, a source of alternating current, current control means comprising a pair of electron discharge tubes including grid and plate circuit elements, output taps adapted to be connected to a motor, the plate circuits of said tubes being connected across said alternating current source and including said output taps, electrical signal supplying means, means for applying said signal to the grids of said tubes, means for feeding back a grid bias potential from the plate circuit of each tube to the grid of the other tube, and means associated with each feed back means for producing a derivative potential corresponding to a rate of change of said signal and for combining it with the bias potential fed back through the associated feed back means.

8. In a signal amplifier circuit, a source of alternating current, a pair of current control, electron discharge tubes including grid and plate circuit elements, a relay comprising a pair of field coils adapted to operate the armature thereof in opposite directions, the plate circuits of said tubes being connected across said current source with their plates in out-of-phase voltage relation and respectively including one of said relay coils, means including a rate circuit for feeding a bias potential and a time derivative thereof from the plate circuit of each tube to the grid of the other, an electrical signal transformer, and means for supplying a signal to the grid of at least one of said tubes.

9. In a control circuit of the character described, a source of alternating current, a pair of current control, electron discharge tubes including grid and plate circuit elements, output taps adapted to be connected to a controllable load, the plate circuits of said tubes being connected across said alternating current source and including said output taps, means including a rate circuit for supplying a grid bias potential and a derivative thereof from the plate circuit of one tube to the grid of the other, electrical signal supplying means, and means for applying said signal to the grid of one of said tubes.

10. In a control circuit of the character described, a source of alternating current, a pair of current control, electron discharge tubes including grid and plate circuit elements, output taps adapted to be connected to a controllable load, the plate circuits of said tubes being connected across said alternating current source and including said output taps, rate circuits connected respectively between the plate circuits of each tube and the grid of the other, electrical signal supplying means, and means for applying said signal to the grid of one of said tubes.

11. In a control circuit of the character described, a source of electrical energy, a pair of current control, electron discharge tubes including grid and plate elements, output taps adapted to be connected to a controllable load, the plates of said tubes being connected to said source of electrical energy and the plate circuits of said tubes including said output taps, means including a rate circuit for supplying a grid bias potential and a derivative thereof from the plate circuit of one tube to the grid of the other, electrical signal supplying means, and means for applying said signal to the grid of at least one of said tubes.

12. In a control circuit of the character described, a source of electrical energy, a pair of current control, electron discharge tubes including grid and plate elements, output taps adapted to be connected to a controllable load, the plates of said tubes being connected to said source of electrical energy and the plate circuits of said tubes including said output taps, a feed-back circuit connected between the plate circuit of one tube and the grid of the other, said feed-back circuit including a resistance-capacitance network arranged to supply a bias potential from the plate circuit of one tube and a derivative thereof to the grid of the other, electrical signal supplying means, and means for applying said signal to the grid of one of said tubes.

13. In a control circuit of the character described, a source of electrical energy, a pair of current control, electron discharge tubes including grid and plate elements, output taps adapted to be connected to a controllable load, the plates of said tubes being connected to said source of electrical energy and the plate circuits of said tubes including said output taps, means for deriving a bias potential from the plate circuit of one tube, a first resistance-capacitance network connected to receive said bias potential for producing a first derivative voltage substantially proportional to rate of change of the bias potential, a second resistance-capacitance network connected to receive said first derivative voltage for producing a second derivative voltage, means for combining the bias potential and derivative voltages and for applying them as a bias to the grid of the other tube, electrical signal supplying means, and means for applying said signal to the grid of one of said tubes.

ROBERT FRED HAYS, Jr.